United States Patent Office 2,893,717
Patented July 7, 1959

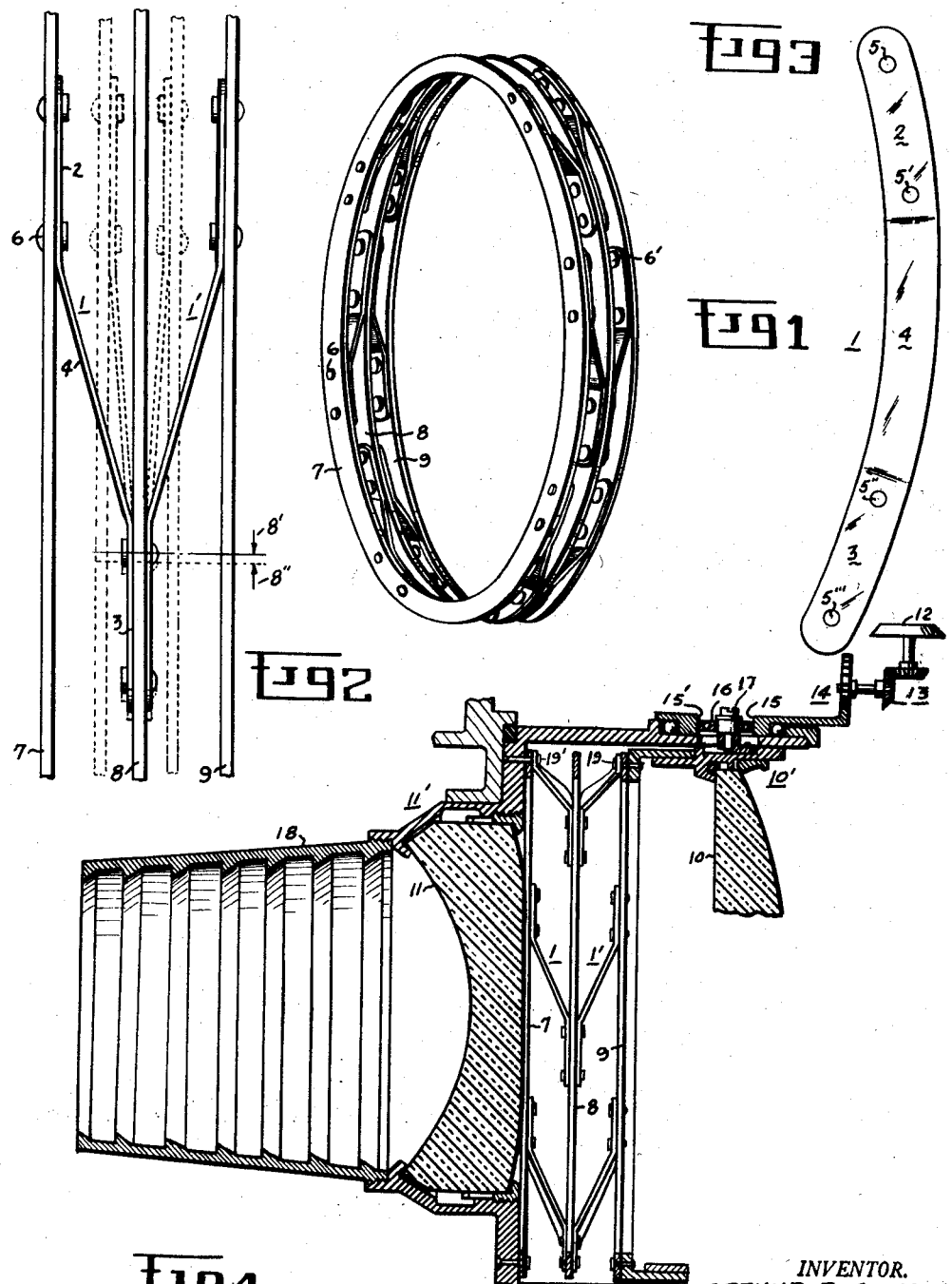

2,893,717

SPRING MOUNTED FOCUSING DEVICE

Arthur B. Simmons, Rochester, N.Y., assignor, by mesne assignments, to the United States of America as represented by the Secretary of the Air Force Application June 28, 1955, Serial No. 518,696

2 Claims. (Cl. 267—1)

This invention relates to a spring mounted focusing device and more particularly to a camera lens focusing device free from rotary torque.

Aeronautical camera work includes the construction and the use of cameras containing lenses four feet in diameter. The mounting and the adjustment of pluralities of lenses to minimize lens and mounting mechanical limitations and imperfections in striving to secure optimum optical characteristics and performance in terms of light wave lengths require the nearest possible approach to mechanical perfection as a supplement to human skill. Previous lens mounts introduced some lens rotation with lens adjustments.

The present invention provides a new and improved spring mounted lens focusing device which is substantially free from rotational torque during and after adjustments.

One of the objects of the present invention is to provide a new and improved nontorsional camera lens spring mount particularly applicable to lens assemblies.

Another object is to provide a centrally apertured compression spring capable of the yielding transfer of axially directed compression forces entirely free from any rotary component.

A further object is to provide a rotary component absorbing and dissipating spring assembly which is strongly resistant to the application thereto of diametrically directed forces.

Another object of the present invention is to provide a simply designed, inexpensively constructed, assembled and tested spring which is well adapted to mass production in volume and which is capable of long and dependable service.

An illustrative embodiment of the present invention is shown in the accompanying drawing wherein:

Fig. 1 is a perspective view of a ring spring assembly which embodies the present invention;

Fig. 2 is an enlarged fragmentary elevational view of a part of the spring assembly shown in Fig. 1;

Fig. 3 is an enlarged plan view of a resilient element of the spring assembly shown in Fig. 1; and Fig. 4 is a fragmentary axial elevational section of a spring mounted focusing device using the spring assembly shown in Fig. 1.

The nontorsion transmitting, centrally apertured or ring spring assembly, shown in Fig. 1 of the accompanying drawing, depends for its resilience upon a simply stamped, shaped and tempered spring member 1.

The spring member 1 has a pair of end portions 2 and 3 which are offset or in different planes with respect to each other and which are connected with each other by an intermediate portion 4. The spring member 1 is apertured at 5, 5', 5'', 5''', etc. so that it may be attached to other members in building a spring assembly. The spring member 1 provides the resilience for the assembly of which it is a part and illustratively may be made of a good quality sheet spring steel or the like. The spring member 1 illustratively is shown as an arc of a circle of a desired curvature. The spring member midportion 4 may be flat as shown, with bending stresses concentrated at its junctions with the end portions 2 and 3, or the curvature may be more distributed by a more serpentine contour, as preferred.

The centrally apertured spring assembly shown in fragmentary form in Fig. 2 of the accompanying drawing comprises a desired plurality of the spring members 1 preferably mounted in Y-shaped pairs between mounting rings 7 and 9 and preferably with a midring 8 therebetween. The spring members 1 are secured to the rings 7, 8 and 9 by rivets 6, 6', etc., bolts, welding or the like. The rings 7, 8 and 9 may be stamped from the same type and gage of spring steel sheet as are the spring members 1, so that all members of the assembly may be produced by simple stamping, shaping and tempering operations.

The Y mounting of pairs of spring members 1 and 1' serves the useful function of putting the spring members in thrust when the spring assembly is subjected to axially directed compression forces. Compression forces applied axially to the spring assembly in Fig. 2 compresses it as indicated by dash lines. The compression of the spring assembly rotates the middle ring 8 circumferentially for the distance between the points 8' and 8'' in Fig. 2. The removal of the axially directed compression forces rotates the middle ring 8 for the same circumferential distance from 8'' to 8' in the opposite direction. In this manner the circumferentially freely moving middle ring 8 assumes substantially all of the circumferentially directed component of any axially directed force of compression, between physical limits, which is exerted upon the axial end rings 7 and 9.

The advantages accompanying the operation under compression of the three ring, Y-spring member embodying assembly shown in Fig. 1 of the accompanying drawing adapt the device for its use in lens mount assemblies, such as that shown in axial section in Fig. 4.

In Fig. 4 a rear positive lens 10 is mounted in an axially movable positive lens mount 10' and a rear negative lens 11 is mounted in a nonmovable negative lens mount 11'. It is most advantageous for adjustments between the lenses 10 and 11 to be accomplished without rotary motion therebetween.

Changes in the axial distance separating the lenses 10 and 11 are accomplished by the rotation of a knob 12 from outside of the lens assembly housing. Operation of the knob 12 acts through a pair of bevel gears 13 and through elliptical gears 14 to rotate an outer sleeve including a pair of opposed cam surfaces 15 and 15'. The cam surfaces 15 and 15' engage to direct a cam follower 16. The cam follower 16 carries a pin 17 which extends from the cam follower through a slot in the axially movable positive lens mount 10'. Axial movement of the cam follower 16 moves the lens element 10 axially with respect to the lens element 11.

The centrally apertured ring in Fig. 1 preferably is mounted between the axially movable positive lens mount 10' and the negative lens mount 11'. The centrally apertured ring is secured in place by suitable means such as by rivets 19, 19', etc., bolts or the like. With the centrally apertured ring assembly in Fig. 1 serving as a nonrotating compression spring mounted in the focusing device in Fig. 4, circumferential exact registration is assured for all axial lens adjustments by operation of the knob 12.

It is to be understood that limited modifications may be made in the parts and in the operation of the device disclosed herein without departing from the scope of the present invention.

What I claim is:

1. A spring mounted focusing device, comprising three axially spaced rings, a plurality of spring members each of which has offset end portions and an intermediate portion and is disposed between the center ring and one of the outer rings, and means securing the offset end portions of each of said spring members to the adjacent pair of said rings to provide a three ring assembly adapted to yieldingly resist compression forces directed axially at the rings and with substantially no rotary force components appearing at the end rings of the three ring assembly.

2. A spring device comprising three axially spaced rings disposed in planes which are substantially parallel with respect to each other, and a plurality of spring members each of which has its opposite ends secured to the adjacent pair of said axially spaced rings in axially alining and in securing the rings with respect to each other as a single device of integral parts yieldingly resisting the displacement axially of the assembly without relative rotation between the first and third rings of the device.

References Cited in the file of this patent

UNITED STATES PATENTS

| | | |
|---|---|---|
| 1,145,718 | Thompson | July 6, 1915 |
| 1,657,844 | Smith | Jan. 31, 1928 |
| 1,826,415 | Bragg et al. | Oct. 6, 1931 |
| 1,848,402 | Wollensak | Mar. 8, 1932 |
| 2,270,311 | Kende et al. | Jan. 20, 1942 |
| 2,380,453 | Lateiner | July 31, 1945 |
| 2,496,928 | Bing et al. | Feb. 7, 1950 |
| 2,565,108 | Zahodiakin | Aug. 21, 1951 |
| 2,713,482 | Stapleton | July 19, 1955 |

FOREIGN PATENTS

| | | |
|---|---|---|
| 284,014 | Great Britain | Jan. 23, 1928 |